United States Patent [19]
Hensley

[11] 3,712,178

[45] Jan. 23, 1973

[54] AIR OPERATED SPRING BRAKE

[76] Inventor: James R. Hensley, 1325 Nutmeg, Escondido, Calif. 90240

[22] Filed: June 25, 1971

[21] Appl. No.: 156,665

[52] U.S. Cl. .................... 91/170 R, 91/443, 92/63, 92/114, 92/130
[51] Int. Cl. ........................ F01b 1/02, F01b 7/00
[58] Field of Search ......... 91/170 R, 443; 92/63, 130, 92/114

[56] References Cited

UNITED STATES PATENTS

| 3,136,227 | 6/1964 | Williams | 92/63 |
| 3,244,079 | 4/1966 | Herrera | 92/63 |
| 3,302,530 | 2/1967 | Dobrikin et al. | 92/63 |
| 3,406,609 | 10/1968 | Cox, Jr. | 92/63 |
| 3,431,031 | 3/1969 | Ike | 92/63 |

*Primary Examiner*—Paul E. Maslousky
*Attorney*—William C. Babcock

[57] ABSTRACT

An air operated spring brake for use on automotive equipment that is normally actuated by air under pressure delivered thereto through a service line, but upon failure of the air supply a compressed volute spring automatically actuating a push rod to set the brakes on the vehicle.

The spring brake of the present invention has a positive pressure maintained in a second confined space thereof to prevent actuation of the volute spring, and air from this confined space in the event of failure of air under pressure in the main supply line, being discharged therefrom at a modulated rate to prevent the sudden setting of the brakes on the vehicle. In other words, the brake assembly of the present invention automatically brings the vehicle to a gradual stop, rather than the brakes being suddenly applied as occurs in prior art devices of this nature, when there is a failure of the pressurized air supply.

11 Claims, 6 Drawing Figures

INVENTOR
JAMES R. HENSLEY
BY William G. Babcock
ATTORNEY

AIR OPERATED SPRING BRAKE

BACKGROUND OF THE INVENTION

1. Field of the Invention

Improved air operated spring brake for gradually bringing a vehicle on which it is mounted to a stop upon a failure of the pressurized air supply source.

2. Description of the Prior Art

In the past, combined air operated brakes and spring operated means to automatically set the brakes in the event of a failure of the main air supply have been used extensively on industrial vehicles. However, such devices are not wholly satisfactory, in that they are unduly bulky, and the spring means upon failure of the air supply sets the brakes suddenly and automatically. The sudden setting of the brakes on an automotive vehicle such as a truck or the like when the vehicle is traveling at a high speed is dangerous, for the sudden setting of the brakes may throw the vehicle into a skid which temporarily places the vehicle out of control, as well as being a hazard to the driver when he is subjected to a sudden stopping of the vehicle.

The primary purpose in devising the present invention is to provide an improved air operated spring brake that will be more compact than prior art devices of this nature, and one that when actuated by failure of the air supply will gradually bring the vehicle on which it is mounted to a stop, and minimize the danger of the vehicle going into a skid, or the driver being injured as a result of the sudden application of the brakes.

SUMMARY OF THE INVENTION

An air operated spring brake assembly of simplified and compact design that may be easily mounted on or removed from a vehicle, with the brake normally being actuated by air under pressure delivered thereto through a service line, but upon the source of pressurized air failing, a volute spring forming a part of the assembly being permitted to gradually expand and set the brakes of the vehicle without throwing the vehicle into a skid or stopping the same so suddenly that the driver of the vehicle may be injured.

The spring brake assembly includes an actuating rod that is moved by expansion of the volute spring, but with the volute spring normally being prevented from so expanding due to air under pressure in a third compartment that forms a part of second confined space. Upon failure of the main source of pressurized air, the air in the third compartment is permitted to gradually flow therefrom at a desired modulated rate, and as the air escapes from the third compartment the volute spring is permitted to expand, and in so expanding moves a push rod that is operatively associated with the brakes of the vehicle. This movement of the push rod causes the brake of the vehicle with which it is operatively associated to gradually set and slow down the movement of the vehicle to a stop.

After a brake of a vehicle has been set by expansion of the volute spring, the vehicle cannot be moved until after the pressurized air system has been repaired to the extent that air under pressure can be maintained in the third compartment. When air under pressure is discharged into the third compartment, the volute spring will automatically be compressed, and thereafter permit normal operation of the air operated portion of the device. Should it not be possible to repair the portion of the pressurized air system that has failed, mechanical means are provided for removably engaging the actuating rod, and thereafter moving the actuating rod in a direction to compress the volute spring to a position where it does not maintain a brake of the vehicle in a braking position. The vehicle may now be towed or otherwise moved to a location where repairs may be made to the source of pressurized air on the vehicle.

The brake as illustrated in the drawings and in the following specification is of such design that one air operated spring brake is provided for each wheel of the vehicle, as well as each wheel of a trailer drawn thereby. Normally, air operated spring brakes of the type described and claimed herein will not be employed on the forward wheels of the vehicle that are used for steering purposes.

A major object of the present invention is to supply an improved air operated spring brake that is more compact that previously available devices of this nature used on industrial vehicles, and the brake being of such design that upon failure of the pressurized air system that supplies air through the service lines to the brake, a volute spring that forms a part of the brake assembly will be permitted to gradually expand at a desired modulated rate, and in so expanding gradually apply the brakes to the vehicle to bring the latter to a stop without the danger of the vehicle being thrown into a skid, or the driver being injured due to the sudden stopping of the vehicle.

DESCRIPTION OF THE PREFERRED EMBODIMENTS

Figure 1:
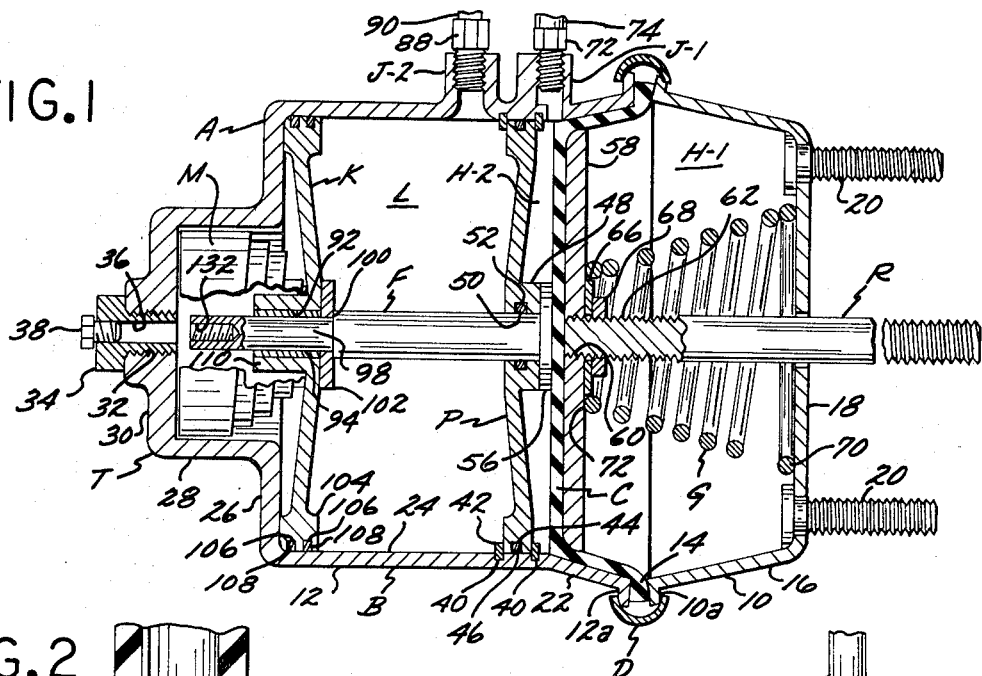
FIG. 1 is a longitudinal cross sectional view of the air operated spring brake, with the brake being in the position it normally occupies when the air supply used in actuating the brake is at a predetermined pressure, and the driver of the vehicle is not using this air to actuate the brakes on the vehicle.

The air operated spring brake assembly A of the present invention is shown in FIG. 1 and preferably includes a generally cylindrical housing B that is preferably defined by a forwardly disposed portion 10 and rearwardly positioned portion 12. The portions 10 and 12 as may best be seen in FIG. 1 have two outwardly extending flanges 10a and 12a that are adjacently positioned and grip the peripheral edge 14 of the resilient diaphragm C therebetween. A retaining ring assembly D is provided that pressure-contacts the forward and rearward surface of the flanges 10a and 12a, and maintains the flanges in gripping contact with the peripheral portion 14 of the diaphragm C.

The forward portion 10 is preferably defined by a forwardly and inwardly tapering side wall 16 that on its forward end develops into a first end piece 18. Mounting bolts 20 project outwardly from the first end piece 18 to permit the spring operated valve assembly to be easily and conveniently mounted on a portion of the vehicle (not shown), adjacent the wheel or set of wheels E of the vehicle that are to be braked by actuation of the air operated spring brake assembly A.

The second portion B of the housing rearwardly of the flange 12a develops into an inwardly and rearwardly tapered side wall section 22, which section merges on the rearward portion thereof into a cylindrical shell 24 that is connected to a second end piece 26. The second end piece 26 in substantially the center thereof develops into a rearwardly extending second cylindrical side wall 28 of smaller diameter than the side wall 24. The cylindrical side wall 28 on its rearward end develops into a third end piece 30 that has a centrally disposed tapped bore 32 extending longitudinally therethrough. The tapped bore 32 is engaged by an externally threaded bolt-like member 34 that has a bore 36 extending longitudinally therethrough, which bore is normally closed by a plug or bolt 38 as shown in FIG. 1. The purpose of the bolt-like member 34 and bore 36 will later be explained in detail.

The forward interior surface of the shell 24 as may best be seen in FIG. 1 has two longitudinally spaced circumferentially extending grooves 40 formed therein that are engaged by resilient snap rings 42 and these snap rings serving to contact the peripheral edge portions of a partition P that transversely spans the interior of the shell 24. To prevent escape of fluid between the interior surface of the shell 24 and exterior surface of the partition P, the outer circumferential portion of the partition P has a circumferentially extending groove 44 therein that is engaged by an O-ring 46 that pressure seals with the interior surface of the shell 24. The partition P has a forwardly extending boss 48 formed as a part thereof in which a longitudinally extending bore 50 is formed. The bore 50 is in communication with a circumferentially extending recess 52 formed in the boss 48, and the recess being occupied by a resilient sealing ring 54 that is at all times in slidable sealing contact with an actuating member F, the purpose of which will later be explained.

The actuating member F will normally be a heavy rod and of circular transverse cross section. The actuating member F on the forward end thereof is welded to a transversely positioned plate 56 that serves as a pressure member when the actuating member F is moved to the right as viewed in FIG. 1.

Figure 4:
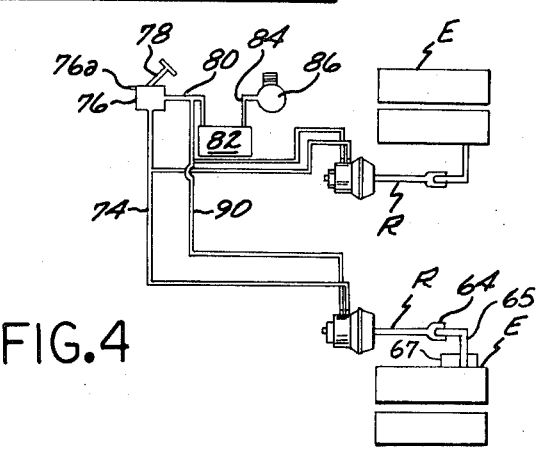
FIG. 4 is a schematic diagram indicating the manner in which the air operated spring brakes are connected to a source of air under pressure, to selectively set the brakes of a vehicle when a normally closed foot operated valve is actuated by the driver of the vehicle, and to automatically set the brakes of the vehicle when there is a failure of the pressurized air supply.

The resilient diaphragm C as shown in FIG. 1 on its forward face is in abutting contact with a heavy circular pressure plate 58 which plate has a centrally disposed longitudinally extending tapped bore 60 that threadedly engages a rearward externally threaded portion 62 of a push rod R. Each push rod R is removably connected by conventional means 64 as shown in FIG. 4, to a member 65 that when moved from a first position to the right to a second position actuates a brake 67 on a set of wheels E. A washer 66 encircles the threaded portion 62 of the push rod R, and is in abutting contact with the forward face of the pressure plate 58 and is so held by a jam nut 58 that engages the threaded portion 62 of the push rod R as may be seen in FIG. 1.

A compressed volute return spring G is provided, preferably of a volute configuration, with a forward end 70 of the spring being in abutting contact with the interior surface of the first end piece 18, and a second end 72 of the spring abutting against the forward face of the pressure plate 58, spring G being held in a fixed position on this forward face due to the second end 72 thereof encircling the washer 66. The return spring G as may best be seen in FIG. 1 at all times tends to hold the resilient diaphragm C in pressure contact with the forward surface of the pressure member 56 as shown in FIG. 1.

The diaphragm C as may best be seen in FIG. 1 serves to divide the confined space in the housing B forwardly of the partition P into first and second compartments H-1 and H-2 that are of variable volume. Two longitudinally spaced internally tapped bosses J-1 and J-2 project outwardly from the side wall 24, with the boss J-1 being connected by a conventional fitting 72 to a conduit 74 through which air under pressure may be discharged when a normally closed foot operated valve 76 mounted in the vehicle (not shown) has the actuating pedal 78 thereof depressed to place the valve in an open position. The valve 76 is connected by a conduit 80 to a reservoir 82 that at all times has air under a predetermined pressure therein. The pressurized air is supplied to the reservoir 82 through a conduit 84 as shown in FIG. 4 that is connected to the discharge of compressor 86 that normally will be driven by the engine (not shown) of the automotive vehicle (not shown) on which the brake assembly A is mounted. When the brake pedal 78 is depressed, the valve 76 is opened, and air under pressure discharges through the conduit 74 into the second confined space 62 and in so doing the resilient diaphragm C, pressure plate 58 and push rod R are concurrently moved to the right to set the brake (not shown) on one of the wheels E of the vehicle (not shown).

When the pressure is released from the brake pedal 78, spring means (not shown) in the valve 76 automatically return the valve to the closed position, and in so doing vent pressurized air in the second compartment H-2 to the atmosphere through a vent 76a that forms a part of the valve assembly 76. The return spring G may now expand to the position shown in FIG. 1, and in so doing it concurrently moves the pressure plate 58, diaphragm C and push rod R to the left as shown in FIG. 1, with the brakes on the vehicle no longer being actuated.

The interior surface of the shell 24 and the left hand surface of the partition P, as viewed in FIG. 1, cooperate with the right hand surface of a piston K, as viewed in FIG. 1, to define a third compartment L. The third compartment L is filled with air under a predetermined pressure through a valve assembly 88 that engages the tapped bore in the second boss J-2 and the valve assembly being connected to a conduit 90 that is at all times in communication with the air reservoir 82. The piston K has a longitudinally extending bore 92 formed therein that is engaged by a sleeve 94, which sleeve in turn slidably engages a rearward extension 98 of the actuating member F. The rearward extension 98 and the forward portion of the member F at their junction define a circumferentially extending body shoulder 100. A washer 102 encircles the rearward extension 98 and is situated in abutting contact with the shoulder 100 and the forward surface of the sleeve 94. The piston K has a circumferentially extending outer portion 104 in which circumferential grooves 106 are formed that serve to support resilient rings 108 in slidable sealing contact with the interior surface of the shell 24.

The side wall 28 and third end piece 30 serve to define a cup shaped case T in which a heavy volute spring M is disposed, with a rearward end of the spring being in abutting contact with the forward surface of the third end piece 30. The forward portion of the spring encircles a rearwardly extending boss 110 in which the bore 92 is formed, with the forward end of the spring M being in abutting contact with the central rearward portion of the piston K. When the spring brake is being utilized on a vehicle (not shown) the compartment L will be filled with air under pressure sufficient to maintain the volute spring M in the compressed configuration illustrated in FIG. 1. However, upon the air pressure in the brake system failing, the air under pressure in the compartment L will tend to flow therefrom through the bore J-2. If this flow is permitted to take place without any restriction, the volute spring M will expand in an extremely short period of time to move the actuating member F and pressure member 56 to the right, and this movement in turn compressing the lighter return spring G as the diaphragm C and pressure plate 58 also move to the right. This movement of the pressure plate 58 to the right also causes concurrent movement of the push rod R, and as a result the brakes on wheels E would be set almost instantly, to perhaps cause skidding of the wheels E and prevent control of the vehicle of which they form a part, as well as causing possible injury to the driver of the vehicle.

Figure 2:
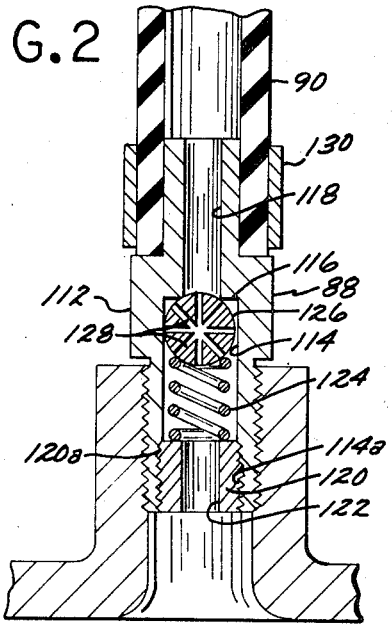
FIG. 2 is a fragmentary transverse cross sectional view of the air operated spring brake assembly, and illustrating a valve used in controlling the flow of pressurized air from a second confined space defined in the brake housing.
Figure 3:
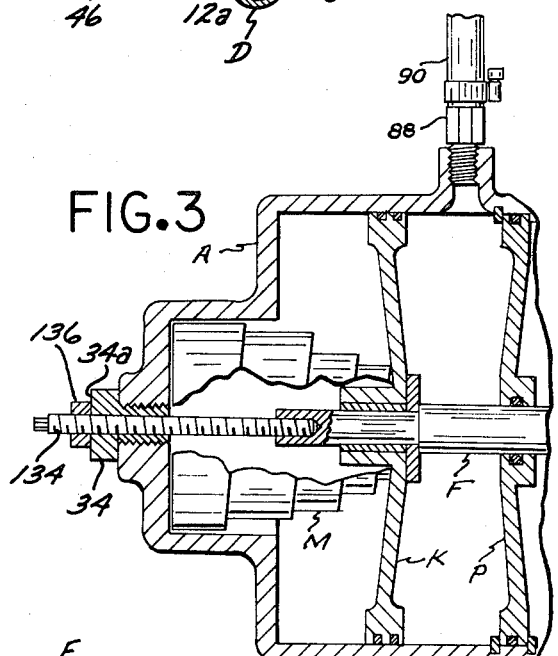
FIG. 3 is a longitudinal cross sectional portion of the spring brake assembly, after the volute spring has expanded due to failure of the air supply, and a threaded member being in engagement with the actuator rod, and this threaded member when a nut associated therewith is rotated moving the actuator rod in a direction to compress the volute spring, which spring in the expanded condition has set a brake on the vehicle to the extent that the latter cannot be moved.

The valve assembly 88 as may best be seen in FIG. 2 includes an elongate body 112 that has a longitudinal bore 114 therein that cooperates to define a valve seat 116 with a counterbore 118 that extends through the balance of the valve body 112. The bore 114 has an internally tapped portion 114a that is engaged by an externally threaded cylindrical sleeve 120 that has a bore 122 extending therethrough. A compressed helical spring 124 is situated in the bore 114, and the spring has the lower end thereof in pressure contact with the upper surface 120a of the sleeve.

The upper end of the spring 124 at all times tends to move a ball 126 of smaller diameter than of bore 114 into engagement with the seat 116. The ball 126 has a number of angularly positioned small diameter air passages 128 extending diametrically therethrough, and so disposed that irrespective of the positioning of the ball 126 on the seat 116 communication will at all times be established by the small diameter bores 128 between bore 114 and counterbore 118. The upper portion of the body 112 is recessed to slidably engage an interior end portion of the conduit 90 and the conduit removably being held on the valve by a clamp 130 of a conventional design. When air is being discharged into the compartment L the ball 126 will be moved downwardly as the spring 124 is compressed, for the flow of air around the ball 126 is subject to less resistance than air flowing through the passages 128. After the compartment L has been filled with air to the desired pressure, the spring 124 will expand to place the ball 126 in the seated position shown in FIG. 2. Upon the air pressure in the reservoir 82 falling below a predetermined value, which is less than the pressure maintained in the compartment L, air will flow from the compartment L through the passages 128 to the conduit 90. However, this air flow will be at a modulated rate, depending on the diameter of the passages 128, and assures the spring M will not be allowed to instantly move the actuating member F to the right to set the brakes on the vehicle as previously explained, but can only move the actuating member F and push rod P at a desired rate, to gradually apply the brakes to the vehicle to prevent skidding of the wheels, or possible injury to the driver.

The extension 98, as can best be seen in FIG. 2, has a tapped longitudinally extending recess 132 that is coaxially aligned with the bore 36. After the brakes (not shown) on the vehicle have been set, due to failure of the air supply, the bolt or plug 38 is removed, and a threaded rod 134 is extended through the bore 36 and rotated until it is in full threaded engagement with the tapped recess 132. A nut 136 is now threaded onto the rod 134 until it is in abutting contact with the surface 34a of the bolt 34. The nut is now rotated relative to the bolt and in so doing the threaded rod 134 and actuating member F and piston K are moved to the left to compress the volute spring M. When the volute spring has been compressed to the left a sufficient distance that the brakes (not shown) on the vehicle are no longer set, the vehicle may be towed or otherwise removed to an area where the damaged air supply system may be repaired.

Figure 5:
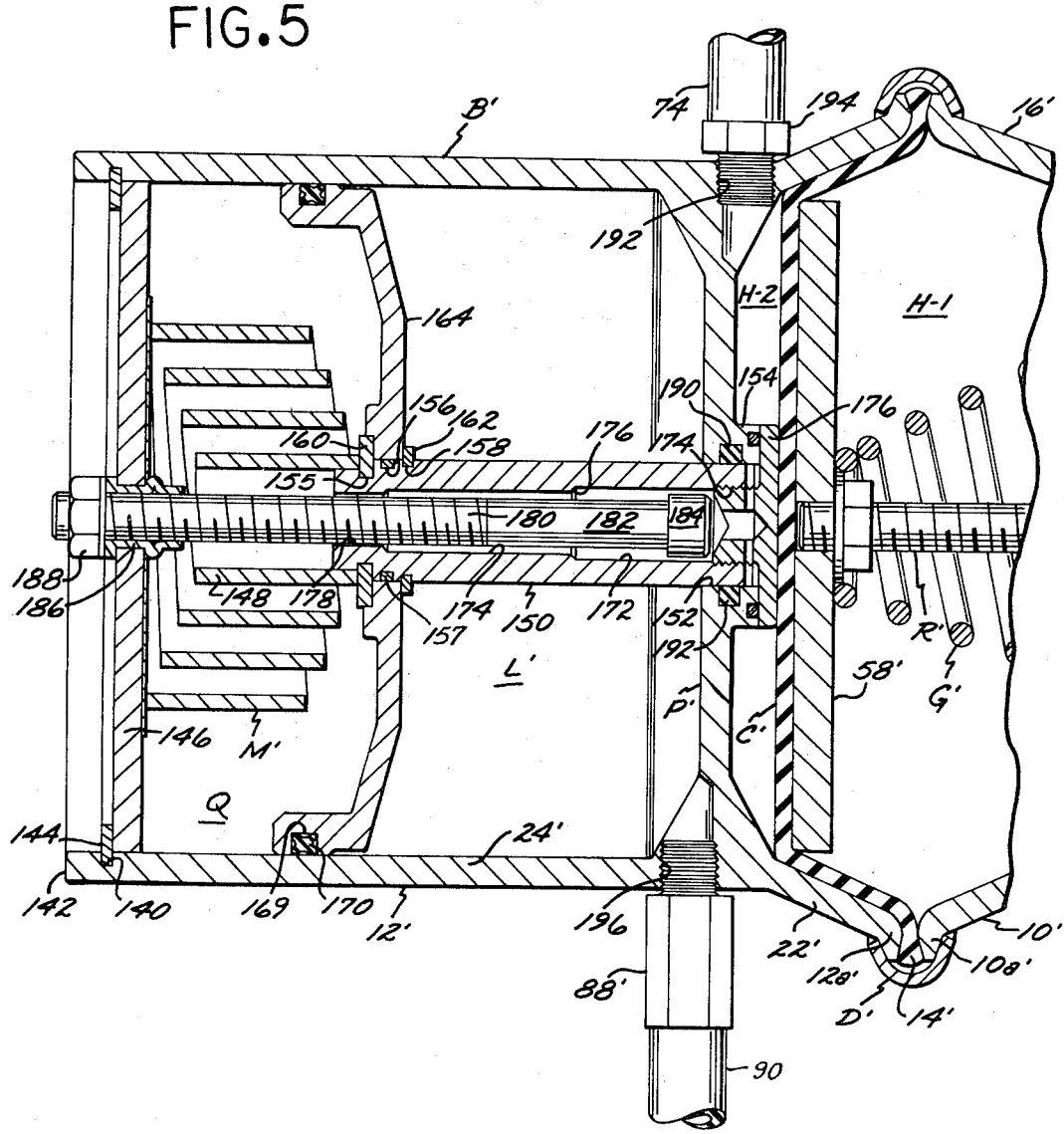
FIG. 5 is a longitudinal cross sectional view of a second form of the invention.

A second form of the invention is shown in FIG. 5. Certain of the elements of the first form of the invention are common to the second form and those elements in FIG. 5 are identified by the letters and numerals previously used on the first form, but with a prime added thereto. The second form of the invention includes a housing B' that includes a forward portion 10' and rearward portions 12'. The housing portions 10' and 12' at their junction have flanges 10a' and 12a' extending outwardly therefrom, and the flanges having a circumferential portion 14' of a resilient diaphragm C' situated therebetween. The flanges 10a' and 12a' are removably engaged by a retaining ring assembly D' as shown in FIG. 5.

The forward portion 10' includes a forwardly and rearwardly tapering side wall 16' that develops into an end piece (not shown) from which mounting bolts (not shown) extend forwardly in the same manner as in the first form of the invention. A push rod R', used in actuating the brakes (not shown), extends through an opening in the end wall (not shown) and is connected by threads or other suitable fastening means to a first pressure plate 58'. The first pressure plate 48' is at all times subjected to a rearwardly directed force by a compressed helical return spring G' that has one end in abutting contact with the first pressure plate, and the other end of the spring being seated against the rearward face of the end wall (not shown) that forms a part of the forward housing portion 10'. The second housing portion 12' is defined by a cylindrical side wall 24' that on its forward end develops into a forwardly and outwardly extending wall section 22' that on its forward extremity defines the flange 12a'. The rearward housing portion 12' includes a partition P' that is preferably formed as an integral part of the side wall 24' and the section 22' by casting or other metal-forming methods.

The rearward end of the second housing portion 12' is open as can be seen in FIG. 5. A circumferentially extending groove 140 is formed on the interior surface of the second housing portion 12' adjacent to the open end 142 thereof. The groove 140 is engaged by a snap ring 144. A circular end piece 146 is transversely positioned within the second housing portion 12' and abuts against the snap ring 144. A compressed volute spring M' is situated within the confines of the second housing portion 12' forwardly of the end piece 146, with the inner coil 148 of the spring having the forward end portion thereof in engagement with a tubular actuator 150. The tubular actuator 150 is slidably mounted in a bore 152 that extends through a forwardly extending boss 154 that forms a part of the partition P'.

The tubular actuator 150 has three longitudinally spaced circumferentially extending grooves 155, 156 and 158 formed therein, with the grooves 155 and 158 being engaged by snap rings 160 and 162 that engage opposite sides of a piston 164 to removably lock the piston to the tubular actuator 150. A resilient sealing ring 157 occupies groove 156 and is in pressure-sealing contact with piston 164. The piston 164 has a groove 169 formed in the outer portion thereof in which a resilient sealing ring 170 is mounted. which ring is at all times in slidable sealing contact with the interior surface of the second housing portion 12'. Tubular actuator 150 has a longitudinally extending bore 172 in the forward portion thereof which is partially threaded, the threads removably engaging threads 174 formed on a second pressure plate 176 as shown in FIG. 5.

The bore 172 is in communication with a rearwardly extending counterbore 174, with the bore and counterbore at their junction defining a circumferentially extending seat 176. The bore 174 at its rearward end develops into an extension 178 of smaller diameter. A rod 182 of smaller transverse cross section than that of extension 178 extends longitudinally therethrough. The rod 182 on its forward end develops into a head 184 of enlarged diameter that is longitudinally movable in the bore 172 but of sufficient transverse cross section as to engage the seat 176. Rod 182 has threads 180 formed on at least the rearward external portion thereof.

The end piece 146 supports a longitudinally extending internally threaded tubular member 186 that engages the threads 180. The thread portion of the rod 182 extends rearwardly from the end piece 146 and has a nut 188 non-rotatably secured thereto by a pin or other conventional means. The boss 154 has a circular recess 190 formed on the interior thereof that is engaged by a resilient sealing ring 192 that is at all times in pressure sealing contact with the exterior surface of the actuator 150. The second housing portion 12' has a first tapped bore 192 formed therein that is engaged by a conventional threaded fitting 194 that is connected to the service line 74. It will be noted that the tapped bore 192 is forward of the partition P', and as a result when air under pressure is discharged into the second confined space H-2, the return spring G' is compressed, as the first pressure plate 58' and push rod R' are moved forwardly to actuate the brakes on the vehicle (not shown).

The second housing portion 12' has a second transverse tapped bore 196 formed therein rearwardly of the partition P', this tapped bore being engaged by a flow control valve 88' that is of the same structure as the flow control valve 88 previously described, with the flow control valve being connected to the conduit 90. When air pressure is maintained in the compartment L' within the second housing portion 12' between the partition P' and piston 164, the piston 164 remains in the position shown in FIG. 5 with the volute spring M' being compressed.

However, upon failure of the air supply in the compartment L', the valve 88' permits the flow of compressed air therefrom at a modulated rate, with the volute spring M' then expanding to move the tubular actuator 150 forwardly, together with the second pressure plate 176. The force exerted by the volute spring M' is substantially greater than that exerted by the return spring G', and as a result the volute spring M' at all times tends to move the push rod R' forwardly to automatically set the brake on the vehicle.

After the air supply to the compartment L' has failed, and the volute spring M' has moved the piston 164 and the tubular actuator 150 forwardly, the brakes that have been set may now be relieved by manually rotating the nut 188 in an appropriate direction. As the nut 188 is rotated it concurrently rotates the threads of rod 182 relative to threaded member 186 and head 184 is moved rearwardly to engage the seat 176. Continued rotation of the nut 188 results in the tubular actuator 150 and piston 164 being moved rearwardly as a unit to compress the volute spring M', with the return spring G' now expanding to move the first pressure plate 58' rearwardly together with the push rod R'. As the push rod R' is moved rearwardly, the brake (not shown) on the vehicle is moved from a set position and the vehicle may be moved to an area where suitable reapirs can be made to the brake system.

The major advantages achieved by the use of the volute spring M and M' in the invention is the long life of the spring under a deformed configuration, and the force exerted by the spring being in substantially direct relationship to the degree of longitudinal deformation thereof. An example of a volute spring M that has been successfully used in the present invention is one formed from chrome vanadium steel strip of 1/8 inch thickness, 1½ inch width, and having a free length of 5¾ inches with a 3⅛ inch maximum external diameter. The spring will normally be preloaded to have a length of 4¾ inches, and when used in the brake assembly will have a working stroke of 2⅝ inches. A spring of the above description requires approximately a 460 pound force for each one inch longitudinal deformation thereof. Thus, the spring M or M' at the beginning of its stroke is capable of exerting 3⅝ inch by 460, or 1665 pounds, and at the end of its working stroke will exert 460 pounds. The above description of a volute spring is merely illustrative of one that may be used in the invention, and is described for that purpose alone.

An important operational advantage of the second form of the invention is that the interior of the housing B' is not in communication with the ambient atmosphere, and as a result dust, dirt and foreign material cannot enter the interior of the housing to render the spring brake inoperative. Inasmuch as compressed air used in actuating the brakes of a vehicle customarily has moisture and foreign materials therein removed therefrom prior to being used for braking purposes, the possibility of moisture accumulating in the second form of spring brake and subsequently freezing to form ice and render the brake inoperative is substantially eliminated.

Figure 6:
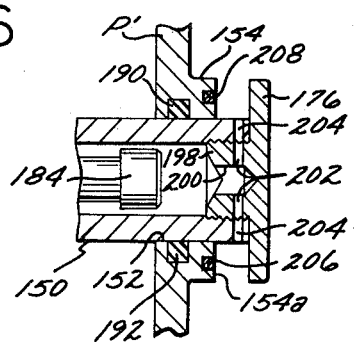
FIG. 6 is an enlarged fragmentary cross sectional view of the actuator and second pressure plate in a second position.

The second pressure plate 176 has an externally threaded protuberance 198 extending rearwardly therefrom that engages threads 174. Protuberance 198 has a forwardly extending recess 200 therein that is in communication with at least one transverse bore 202. Each bore 202 is transversely aligned with a second transverse bore 204 formed in the forward portion of actuator 150 as shown in FIG. 6. A circular recess 206 is formed on the forward face of the boss 154. Recess 206 is occupied by a resilient ring 208 that is in sealing contact with the rearward face of second pressure plate 176 when the spring brake is in the position shown in FIG. 5.

When there is a failure of the source of compressed air on the vehicle, air in the third compartment L' starts to discharge therefrom theough valve 88' at a modulated rate, with spring M' expanding and moving piston 144 to the right as viewed in FIG. 5. A vacuum cannot form in housing portion 12' to the left of piston 164 in a fourth compartment Q as such movement starts, for shortly after such movement is initiated the first and second bores 202 and 204 are moved to the right out of boss 154, as viewed in FIG. 5, and are then in communication with second compartment H-2. Air can now flow from second compartment H-2 through transverse bores 202 and 204, recess 200, bore 170, counterbore 174 and bore extension 178 to fourth compartment Q.

Thus, the air pressure in second compartment H-2 is equalized with the air pressure in fourth compartment Q as spring M' is expanding to the right to set one of the brakes on the vehicle.

After the vehicle has been stopped, the nut 188 and rod 182 are concurrently rotated as previously described to place the second form of the brake in a position where the vehicle can be moved or towed to a location where repairs can be made to the compressed air source thereon. When the nut 188 is so rotated, the actuator 150 is moved rearwardly and the bores 202 and 204 are returned to sealing engagement with the interior of boss 154, and ring 208 is forced into sealing contact with face 154a. After the source of air on the vehicle has been repaired, the nut 188 is rotated to move the rod 182 and head 184 forwardly to occupy the positions illustrated in FIG. 5.

It will be particularly noted that the volute spring M' at all times tends to move longitudinally relative to housing B' and accordingly places no side load thereon.

In the valve 88 the ball 126 is shown as being spring loaded. However, should it be desired, the ball could be slideably mounted in the bore 114 and, without the use of a spring, be responsive to a flow of compressed air from the third compartment L or L', and as a result assume a position, as shown in FIG. 2, on seat 116 when there is a failure of the air supply.

I claim:

1. In a spring brake assembly of the type that includes a housing defined by a generally cylindrical side wall and forward and rearward end pieces, a transverse pratition that divides the interior of said housing into first and second confined spaces, longitudinally aligned openings in said partition and forward end wall, a transverse resilient diaphragm in said first confined space that divides the latter into first and second compartments, a first transverse pressure plate in said first compartment bonded to said diaphragm, a push rod secured to said first pressure plate and extending therefrom through an opening in said forward end piece to actuate a brake on a wheel as said push rod moves from a first towards a second position, a source of compress air from which first and second conduits extend, means for controlling the flow of air from said source to said second compartment, first spring means in said first compartment that at all times tend to maintain said first pressure plate and push rod in a first position, a piston in said second confined space in slidable sealing contact with the interior of said housing, said piston dividing said second confined space into third and fourth compartments, the improvement for operating said spring brake assembly in such a manner that foreign material cannot enter said second, third or fourth compartments from the ambient atmosphere, and said spring brake assembly actuates said brake gradually to bring said wheel with which it is associated to a stop upon a failure of said source of compressed air, said improvement comprising:

a. second spring means in said fourth compartment that is of greater strength than said first spring means;

b. valve means in communication with said second conduit and said third compartment, said valve means allowing said compressed air to flow into said third compartment for said piston to move from a first to a second position and compress said second spring means, but said valve means upon a failure of said source of compressed air allowing air in said third compartment to escape therefrom at a modulated rate, with said rate determining the rapidity with which said push rod will move from said first towards said second position to apply an increasing force to said brake to tend to stop the rotation of said wheel;

c. a second pressure plate in said second compartment;

d. an elongate actuator extending from said piston through said opening in said partition and supporting said second pressure plate in said second compartment in a position to exert a force on said first pressure plate and push rod as said piston moves from said second towards said first position;

e. first sealing means on said partition for slidably engaging said actuator and preventing the flow of air between said second and third compartments;

f. air passage means that are at all times in communication with said fourth compartment, but which establish communication between said fourth compartment and said second compartment to equalize the air pressure therein only when there is a failure of said source of compressed air, and said piston moves from said second position towards said first position as said second spring means expand to move said actuator and second pressure plate from said first towards said second position to gradually set said brake; and g. manually operable means on said brake assembly that may be used to move said piston to said second position after said brake has been set after a failure of said source of compressed air, with said piston when moved to said second position concurrently moving said actuator and second pressure plate longitudinally in said housing to the extent that said first spring means returns said first pressure plate and push rod to said first position thereof.

2. A spring brake assembly as defined in claim 1 in which said second spring means is a volute spring that extends longitudinally between said piston and said rearward end piece, with said volute spring exerting no side load on said housing as said piston moves between said first and second positions thereof.

3. A spring brake assembly as defined in claim 1 in which said valve means includes:

h. a hollow valve body having a first end in communication with said third compartment and a second end in communication with said second conduit, said valve body having a circular seat defined on the interior thereof; and i. a ball of smaller diameter than that of the interior of said valve body, but said ball of larger diameter than that of said seat, said ball having a plurality of angularly positioned bores extending diametrically therethrough, said ball when there is a failure of said source of compressed air being forced onto said seat due to the differential in air pressure between that in said third compartment and that in said second conduit, with said ball when so seated allowing compressed air in said third compartment to discharge therefrom through said bores at said modulated rate.

4. A spring brake assembly as defined in claim 1 in which said air passage means includes:

h. a boss that encircles said opening in said partition and extends forwardly therefrom;

i. first and second resilient sealing rings, said first ring in slidable sealing contact with said actuator and disposed in a first circular recess formed on the interior surface of said boss, with said second ring in pressure-sealing contact with a forward face of said boss when said piston is in said second position, and said seconring mounted in a second circular recess formed on the rearward face of said second pressure plate; and j. a bore that extends longitudinally in said actuator and is at all times in communication with said fourth compartment and is also in communication with a transverse bore in said actuator, with the outer extremity of said transverse bore being situated between said first and second sealing rings when said piston is in said second position, and said transverse bore shortly after said piston starts to move from said second to said first position being in communication with said second compartment to allow the air pressure in said second and fourth compartments to equalize.

5. A brake assembly as defined in claim 1 which, in addition, includes:

h. manually rotatable means mounted on said housing as an integral part thereof that permits free movement of said piston and actuator from said second to said first position, with said rotatable means, when rotated in a first direction after said brake has been set, moving said piston, actuator and second pressure plate to said second position to compress said second spring means and allow said first spring means to expand and move said first pressure plate and push rod rearwardly to the extent that said brake associated with said push rod is no longer set.

6. A brake assembly as defined in claim 5 in which said manually operated means includes:

i. an internally threaded tubular member mounted on said rearward end piece and coaxially aligned with an opening therein;

j. a threaded rod in engagement with said tubular member and extending forwardly therefrom into a bore and counterbore in said actuator, said bore and counterbore at their junction defining a circular seat;

k. a head on the forward end of said rod that is situated in said bore, said head of lesser diameter than that of said bore but of greater diameter than that of said seat; and l. means on an end portion of said rod that projects rearwardly from said rearward end piece for rotating said rod in a first direction to move said rod rearwardly, with said rod as it moves rearwardly positioning said head in contact with said seat, and continued rotation of said rod resulting in said head exerting a rearward force on said seat sufficient to compress said second spring means to the extent that said piston, actuator and second pressure plate can be moved from said first to said second position.

7. A brake assembly as defined in claim 6 in which said means on said end portion is a nut that is non-rotatably secured thereto.

8. A spring brake assembly for use with a source of compressed air from which first and second conduits extend, with the flow of air through said first conduit controlled by a valve mechanism, said assembly of a structure that includes a housing that is divided by a transverse partition into first and second confined spaces, said first confined space divided into first and second compartments of variable volume by a transverse resilient diaphragm, said second confined space divided into third and fourth compartments of variable volume by a piston slidably and sealingly mounted in said second confined space, a first pressure plate in said first compartment bonded to said resilient diaphragm, a push rod secured to said first pressure plate and extending forwardly from said housing to a brake that is to be actuated, spring means in said first compartment for maintaining said first pressure plate and push rod in a first position where said brake is not actuated, a second pressure plate in said second compartment, a longitudinally positioned elongate actuator slidably and sealingly mounted in said partition, with a first end of said actuator connected to said piston and a second end of said actuator supporting said second pressure plate, second compressed spring means in said fourth compartment that at all times tend to expand longitudinally and move said piston, actuator and second pressure plate forwardly from a second to a first position with concurrent movement of said diaphragm, first pressure plate and push rod to the extent that said brake of said vehicle is set, first means for connecting said first conduit to said second confined space for compressed air to be periodically discharged therein to move said diaphragm, first pressure plate and push rod forwardly to actuate said brake, with said spring brake assembly being characterized by:
  a. air passage means that extend between said second and fourth compartments that are closed when said piston, actuator and second pressure plate are in said second position, but said air passage means opening upon a failure of said source of compressed air as said second spring means expands and starts to move said piston, actuator and second pressure plate from said second towards said first position, and said air passage means after opening permitting the air pressure in said second and fourth compartments to equalize; and
  b. valve means connected to said second conduit and third compartment that allow compressed air from said source to enter said third compartment and hold said piston, actuator and second pressure plate at said second position, but said valve means upon a failure of said source of compressed air allowing air in said third compartment to only escape at a modulated rate, which rate determines the rapidity with which said second spring means moves said piston, actuator and second pressure plate from said second to said first position to brake said vehicle.

9. A spring brake assembly as defined in claim 8 that is further characterized by:
  c. rotatable means permanently mounted on said housing for moving said piston, actuator and second pressure plate from a first to a second position after a failure of said source of compressed air to allow said first spring means to move said first pressure plate and push rod to a position where said brake is not set.

10. A spring brake assembly as defined in claim 8 that is further characterized by said second spring means being a volute spring that extends between said actuator and a rearward end of said housing, with said volute spring exerting only an axially directed force on said piston as said piston, actuator and second pressure plate move between said first and second positions.

11. A spring brake assembly as defined in claim 1 in which said valve means includes:
  h. a hollow valve body having a first end in communication with said third compartment and a second end in communication with said second conduit, said valve body having a circular seat defined on the interior thereof;
  i. a ball of smaller diameter than that of the interior of said valve body, but said ball of larger diameter than that of said seat, said ball having a plurality of angularly positioned bores extending diametrically therethrough; and
  j. spring means in said valve body that at all times tend to maintain said ball on said seat, and said ball only being displaced from said seat when compressed air is flowing into said third compartment from said second conduit, and said ball, upon a failure of said source of compressed air, being maintained on said seat by said spring means and allowing air to flow from said third compartment to said second conduit through said bores at a modulated rate, which rate determines the rapidity with which said second spring means can expand to move said piston, actuator and second pressure plate forwardly from said second position to said first position to in turn move said first pressure plate and push rod to actuate said brake.

* * * * *